United States Patent [19]

Dalebout et al.

[11] Patent Number: 5,372,559
[45] Date of Patent: Dec. 13, 1994

[54] ADJUSTABLE INCLINE SYSTEM FOR EXERCISE EQUIPMENT

[75] Inventors: William T. Dalebout; S. Ty Measom; Scott R. Watterson, all of Logan, Utah

[73] Assignee: Weslo, Inc., Logan, Utah

[21] Appl. No.: 27,351

[22] Filed: Mar. 8, 1993

Related U.S. Application Data

[63] Continuation of Ser. No. 806,977, Dec. 12, 1991, Pat. No. 5,192,255, which is a continuation of Ser. No. 494,590, Mar. 16, 1990, abandoned, which is a continuation of Ser. No. 256,486, Oct. 12, 1988, Pat. No. 4,913,396.

[51] Int. Cl.⁵ ............................................. A63B 23/06
[52] U.S. Cl. ..................................... 482/54; 248/649
[58] Field of Search ............... 248/649, 371, 398, 654; 482/54; 297/325, 345, 270

[56] References Cited

U.S. PATENT DOCUMENTS

| | | |
|---|---|---|
| D. 270,555 | 9/1983 | Ogden . |
| D. 283,239 | 4/1986 | Smith . |
| D. 284,597 | 7/1986 | Smith . |
| D. 289,668 | 5/1987 | Germonprez . |
| 3,826,491 | 7/1974 | Elder . |
| 3,858,938 | 1/1975 | Kristensson . |
| 3,892,404 | 7/1975 | Martucci . |
| 3,963,101 | 6/1976 | Stadelmann et al. . |
| 3,966,182 | 6/1976 | Stadelmann et al. . |
| 4,093,196 | 6/1978 | Bauer . |
| 4,344,616 | 8/1982 | Ogden . |
| 4,374,587 | 2/1983 | Ogden . |
| 4,383,714 | 5/1983 | Ishida . |
| 4,445,683 | 5/1984 | Ogden . |
| 4,476,582 | 10/1988 | Ramhorst . |
| 4,502,679 | 3/1985 | DeLorenzo . |
| 4,576,352 | 3/1986 | Ogden . |
| 4,635,927 | 1/1987 | Shu . |
| 4,635,928 | 1/1987 | Ogden et al. . |
| 4,643,418 | 2/1987 | Bart . |
| 4,664,371 | 5/1987 | Viander . |
| 4,729,558 | 3/1988 | Kuo . |
| 4,751,755 | 6/1988 | Carey et al. . |
| 4,759,540 | 7/1988 | Yu et al. . |
| 4,792,134 | 12/1988 | Chen . |
| 4,886,266 | 12/1989 | Trulaske . |
| 5,007,630 | 4/1991 | Real et al. . |

FOREIGN PATENT DOCUMENTS

| | | |
|---|---|---|
| 2225342 | 12/1973 | Germany . |
| 2408052 | 8/1975 | Germany . |
| 2408055 | 8/1975 | Germany . |
| 12429618 | 9/1975 | Germany . |
| 1505702 | 3/1978 | United Kingdom . |
| 22078503 | 1/1992 | United Kingdom . |

OTHER PUBLICATIONS

Precor Advertisement for Product 910ei (no date).
MGIT Redmil Advertisement. (no date).
Cartio Fitness Testing Treadmill Ad. (no date).
Pacer II Ad. (no date).
Gas Spring Corp. Ad. (no date).
Vitamaster Ad. (no date).
Ajay Ad. (no date).
Weslo Pulse Point Assembly Instr. (copyright 1985).
Delo Treadmill Ad. (no date).
Tredex Ad. (no date).
Trotter Ad. (no date).
Jog and Treadmill PA-402 (no date).
Steel Case Ad. (no date).

(List continued on next page.)

*Primary Examiner*—Blair M. Johnson
*Attorney, Agent, or Firm*—Trask, Britt & Rossa

[57] ABSTRACT

A support system for use in adjusting the incline of exercising equipment such as treadmills is disclosed. The system includes a pair of linked support legs pivotally mounted to one end of the equipment's frame. A length-adjustable gas spring is pivotedly associated with the linked support legs and the treadmill. Control means are provided to adjust the orientation of the spring, thereby controlling the elevation of the exercising equipment and hence its incline.

23 Claims, 4 Drawing Sheets

OTHER PUBLICATIONS

J C Penney Fall & Winter Catalog, 1987 p. 755.
*Variable Speed Motorized Treadmill*, Stk. No. 15385w VS–4000, Parts List, etc.
Sears Owners Manual for Exec. Lifestyler 4000.
"Jog–O–Matic XR" from MacLevy Article (Feb./Mar. 1983).
"MGT Treadmill" Article, 1981.
Delo Treadmill (no date).
MGT Strength/Fitness Systems Article, 1981.
Sears 1987 Cagalogs, Microfilm Roll No. 88; 6 pages.
Adjustable incline system of Ajex treadmill with locking gas spring; no date; 1 page.

Macaulay, David; The Way Things Work; Houghton Mifflin Company 1988; 6 introductory pages plus pages.
Stabilus Product Literature; Gas Spring Products; Circa 1991; 12 pages.

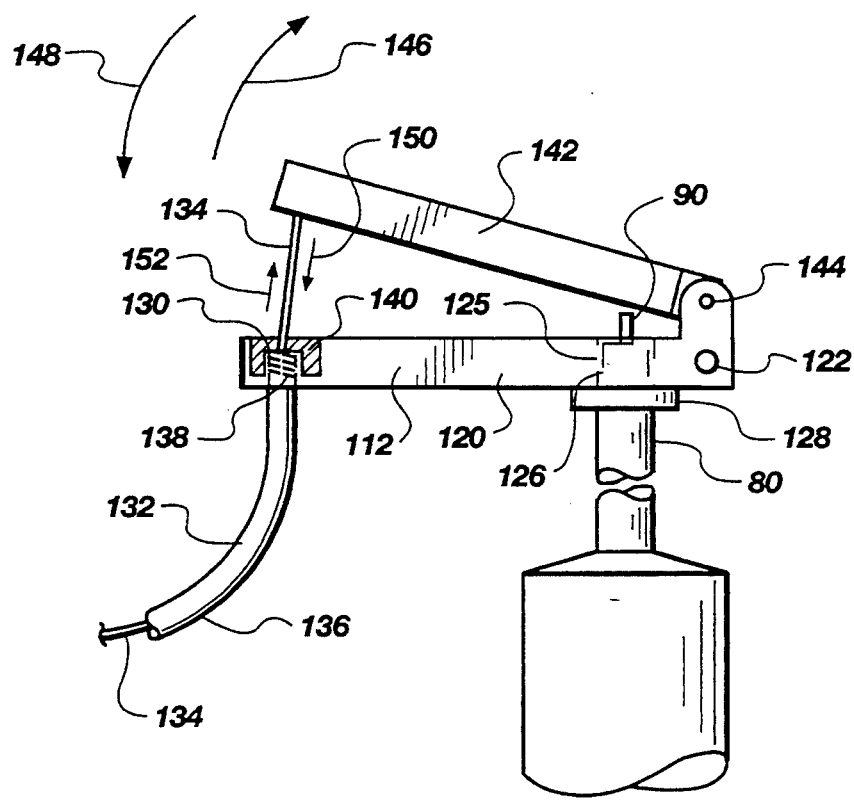
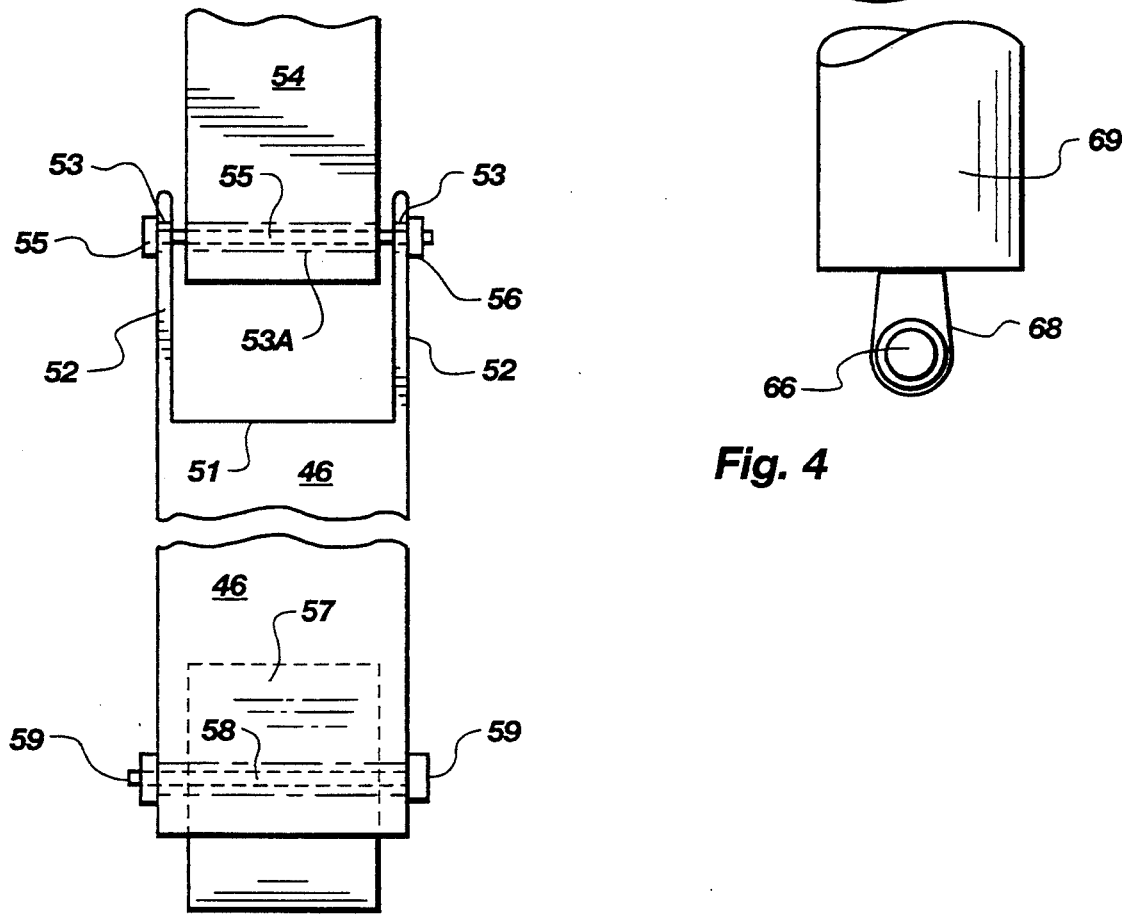
Fig. 3
Fig. 4

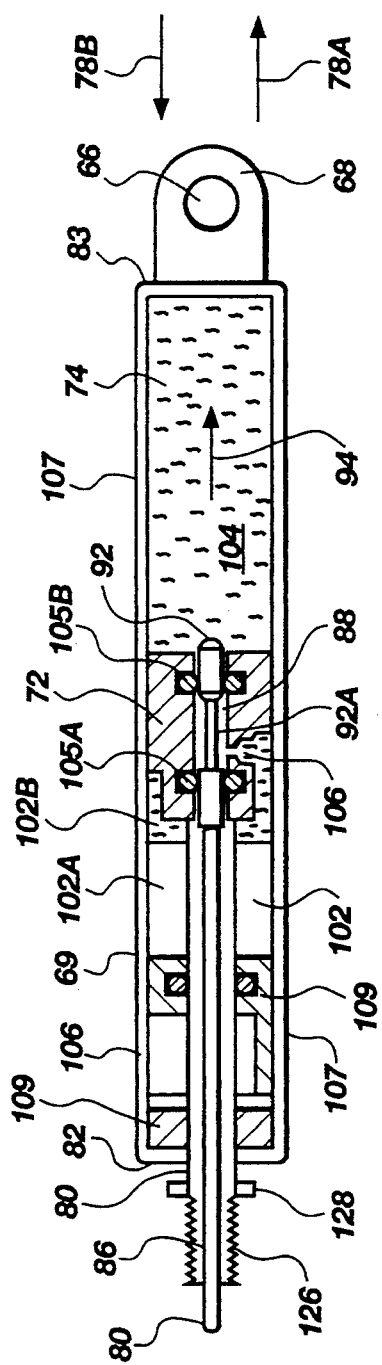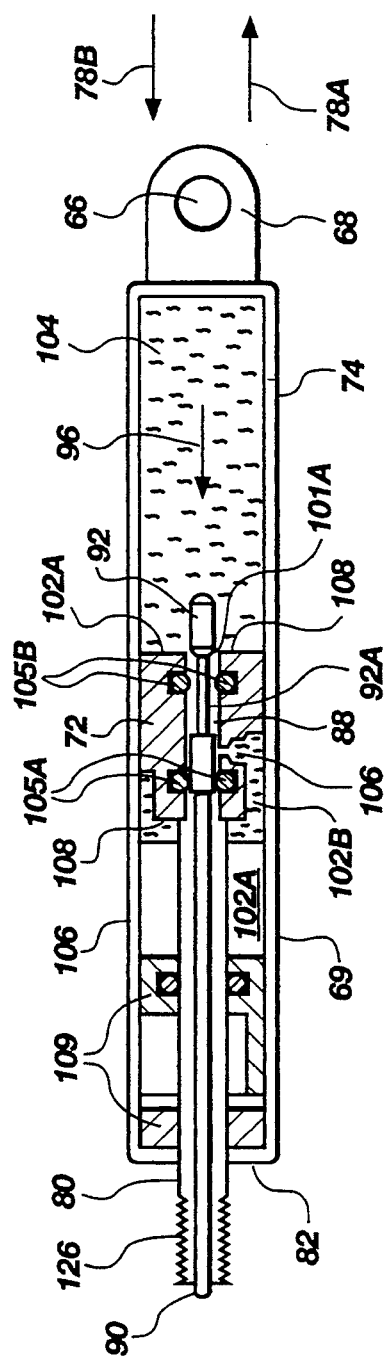

ADJUSTABLE INCLINE SYSTEM FOR EXERCISE EQUIPMENT

This is a continuation of application Ser. No. 806,977, filed Dec. 12, 1991 now U.S. Pat. No. 5,192,255 which is a continuation of Ser. No. 494,590 filed Mar. 16, 1990 now abandoned which was a continuation of Ser. No. 256,486 filed Oct. 12, 1988 now U.S. Pat. No. 4,913,396.

BACKGROUND OF THE INVENTION

1. Field

The invention relates to incline support systems. More specifically, the invention is directed to support systems adapted for use with exercise equipment such as treadmills.

2. Statement of the Art

The functionality of many types of exercising equipment is enhanced by modifying the orientation of that equipment relative to an underlying support surface. In many instances, this capability to reorient the equipment permits the user to adjust and oftentimes increase the level of difficulty of exercises performed using the equipment. This capability becomes important when one recognizes that training, utilizing such equipment, is directed toward increasing the user's physical abilities. As those abilities are augmented, it is desirable that the user may periodically adjust the level of difficulty of the equipment so as to provide a device conducive to challenging the user's physical abilities and thereby contributing to an enhancement of these abilities.

The difficulties in rendering exercise equipment incline adjustable results in part from the weight of such equipment. Due to the stress which such equipment must endure in use, oftentimes such equipment is fabricated from various types of metals, which cause the equipment to be generally heavy. Adjusting the incline of the equipment may be difficult if the user must lift the equipment to the desired height and then manipulate a retaining device which is operable to retain the equipment at the desired height. As a result, some exercise equipment requires two or more individuals to adjust the incline thereof, i.e. one individual holding the equipment in place while the second actuates the retaining device.

A conventional incline system is illustrated in U.S. Pat. No. 4,477,071 (Davis). FIG. 61 of that disclosure illustrates an adjustable incline system which consists of an inverted "T"-shaped support leg having a plurality of open-ended channels defined in the shaft region thereof. The support leg is received within a socket. The socket sidewall defines a pair of oppositely positioned holes which are positioned to register one with another. A pin is inserted through the socket hole and thereafter through one of the support leg channels. The pin subsequently is received in the opposing socket sidewall hole whereby the support leg is detachably retained in the apparatus mounted socket. The incline of the apparatus may be altered by slidingly removing the pin and adjusting the support leg to align another channel in registration with the socket holes. Thereafter, the pin is reinserted to retain the support leg in the desired orientation. Recognizably, the apparatus must be lifted in order to facilitate any adjustment to its incline.

A second embodiment of an incline system is depicted in U.S. Pat. No. 4,374,587 (Ogden) wherein a pair of upright threaded support legs are mounted spaceally apart from one another on the end of a treadmill. The bottom end of each support is rotatably mounted by a ball joint to a footing which rests on the underlying support surface, e.g. the ground. A female threaded socket is mounted on each support, each socket being fixedly mounted to the apparatus to be inclined. One of the supports includes a hand crank mounted thereon. The crankable support is mechanically connected to the non-cranked support by a chain which is trained about sprockets mounted on each of the two supports. A cranked rotation of the first support effects a corresponding rotation of the second support. The sockets are displaced upwards or downwards depending on the direction of rotation of the supports. The apparatus, being mounted to the sockets, is displaced by the sockets.

The Ogden construction involved a considerable amount of structure to effect the lifting or incline function.

A continued need exists for an inclined system which is at once simple in construction yet operative to yield a desired equipment incline with a minimum of energy.

SUMMARY OF THE INVENTION

The incline system of the invention includes an adjustable support means which is mountable to an apparatus to be supported. The support means is at once simple in construction and operable by one individual with a minimum of effort. The support means may be pivotally mounted on its first end to the apparatus, whereby an angular rotation of the support means about its pivot axis causes the incline of the apparatus to be varied. The support means may be mounted to the underside of the apparatus, such that an angular rotation of the support means causes a second end of that means to be urged outward away from the equipment. It is the action of this second end against the underlying support surface which causes the equipment to be either urged away from the underlying surface, e.g. upward, or toward that surface, e.g. downward, to a desired incline elevation.

The support means is mechanically associated with a length adjustable pneumatic (gas) spring which is mounted on its first end to the support means. The pneumatic spring includes an actuation means, e.g. a depressible pin, adapted to alter the pressure or force applied to a piston rod by its piston, which piston is sealingly retained in the cylinder of the spring. The piston rod is mounted at its opposing end, preferably pivotally, to the apparatus being supported.

A control means is mounted to the pneumatic spring itself and may extend to a mounting on the apparatus itself. This control means is adapted to enclose the actuation means on the pneumatic spring and depress that actuation means.

In a preferred embodiment, the control means includes a manually operable lever which is mounted remote from the pneumatic spring, and preferably proximate the anticipated location of a user utilizing the exercise equipment, i.e. the control means lever is mounted on the apparatus within reach of the apparatus user. A cable, having one end mounted to the control lever, extends to a lever-fitted platform fixedly mounted to either the pneumatic spring or on the apparatus itself proximate the actuation means. The cable is connected to the lever on that platform such that a displacement of that cable in a first direction causes that lever to be brought into a forced abutment against the actuation means sufficient to depress i.e., actuate that actuation means.

Operationally, the user can adjust the elevation or incline of the apparatus by manipulating the control lever while standing on the treadmill. The resulting cable displacement functions to bring the lever into contact with the actuation means with sufficient force to depress the actuation means and cause the piston valve to be opened and thereby facilitating the piston's movement within the cylinder of the spring unit. The user can control the degree of elevation achieved by varying his location on the treadmill itself. To maximize the inclination, the user stands proximate that end of the treadmill which is opposite from the end having the support system attached hereto. When the user stands on the treadmill closer to the end having the support system attached thereto, the degree of elevation occasioned by actuating the cylinder is less. The piston rod, in turn causes the support means to rotate about its pivot axis, whereby the end of the support means may be urged outwardly away from the supported apparatus, causing that apparatus to be elevated, i.e. inclined.

BRIEF DESCRIPTION OF THE DRAWINGS

FIG. 3 is a front view of a support leg illustrating the pivot connection means thereof;

FIG. 4 is a side view of a pneumatic spring in association with a cable actuated lever and support platform;

FIG. 7 is a cross-sectional side view of a length adjustable gas spring of the invention; and FIG. 8 is a cross-sectional side view of the length adjustable gas spring shown in FIG. 7, oriented in an actuated condition.

DETAILED DESCRIPTION OF THE DRAWINGS

Figure 1:
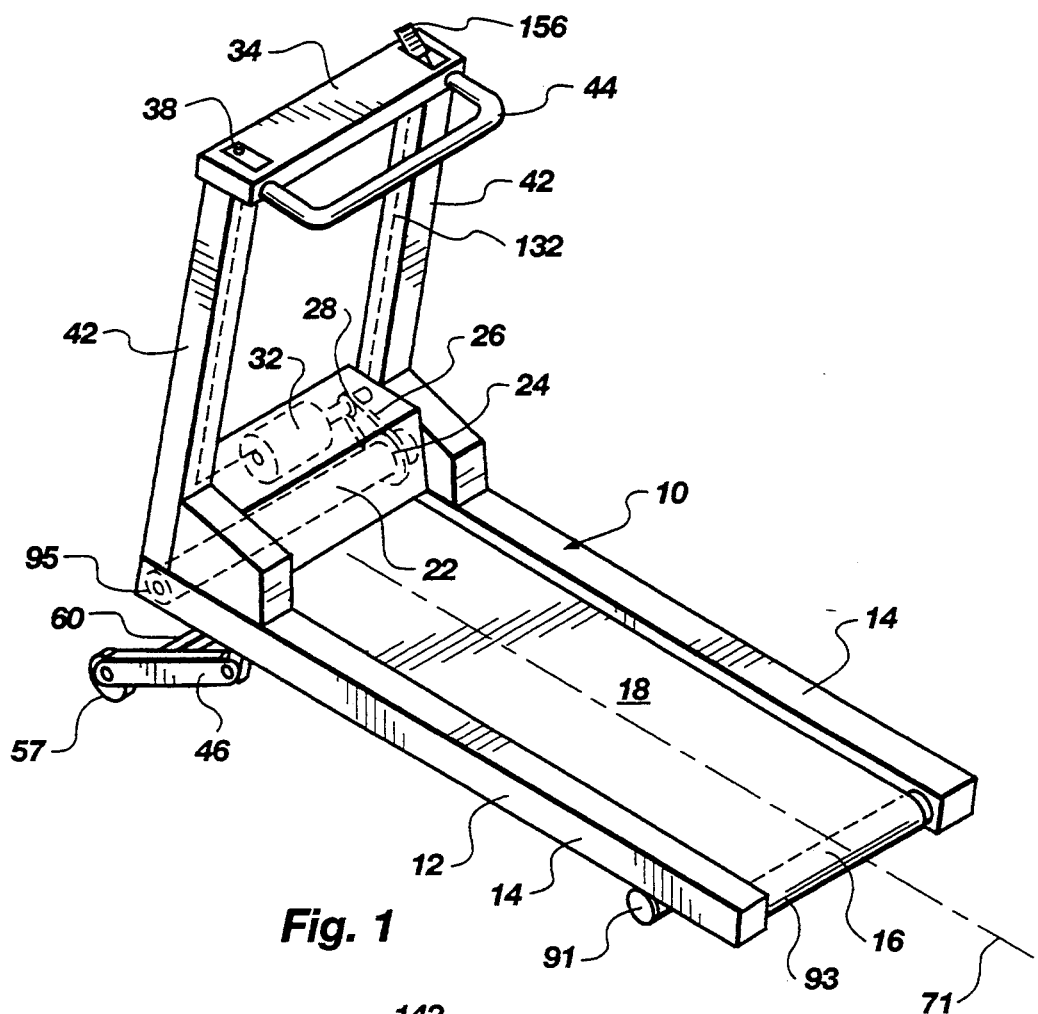
FIG. 1 is an elevated perspective view of a treadmill having an adjustable incline support mounted thereto.

As illustrated in FIG. 1, a treadmill generally 10 is constituted by an elongate lower frame 12 having two rail-like members 14 positioned parallel and spaceally apart from one another. An elongate, cylindrical roller 16 is rotationally mounted to each of the frame rail members 14 to extend between those members to provide a path-defining structure for an endless belt 18 which is trained thereover. Positioned on the opposing end of the rail members 14 is a second elongate cylindrical roller 22 which is similarly rotationally mounted to extend between the spacedly positioned frame rail members 14. A pulley 24 mounted on the second roller 22 has a belt 26 trained thereover, which belt 26 is also trained over a pulley 28 mounted to an electric motor 32. When the motor 32 is actuated, it rotates the pulley 28. In turn, pulley 28 rotates pulley 24 through means of belt 26. The roller 22 is in turn rotated, causing belt 18 to be driven over the rollers 16 and 22 in an endless continuous path. The operation of the motor 32 is controlled by electrical control means 38 mounted on the console 34. The control means 38 is electrically connected to the motor 32.

Console 34 is supported by two upright supports 42 which are mounted on frame rail members 14. Mounted on console 34 is a "U"-shaped bar 44 configured to be held by a user standing on the belt 18.

Figure 2:
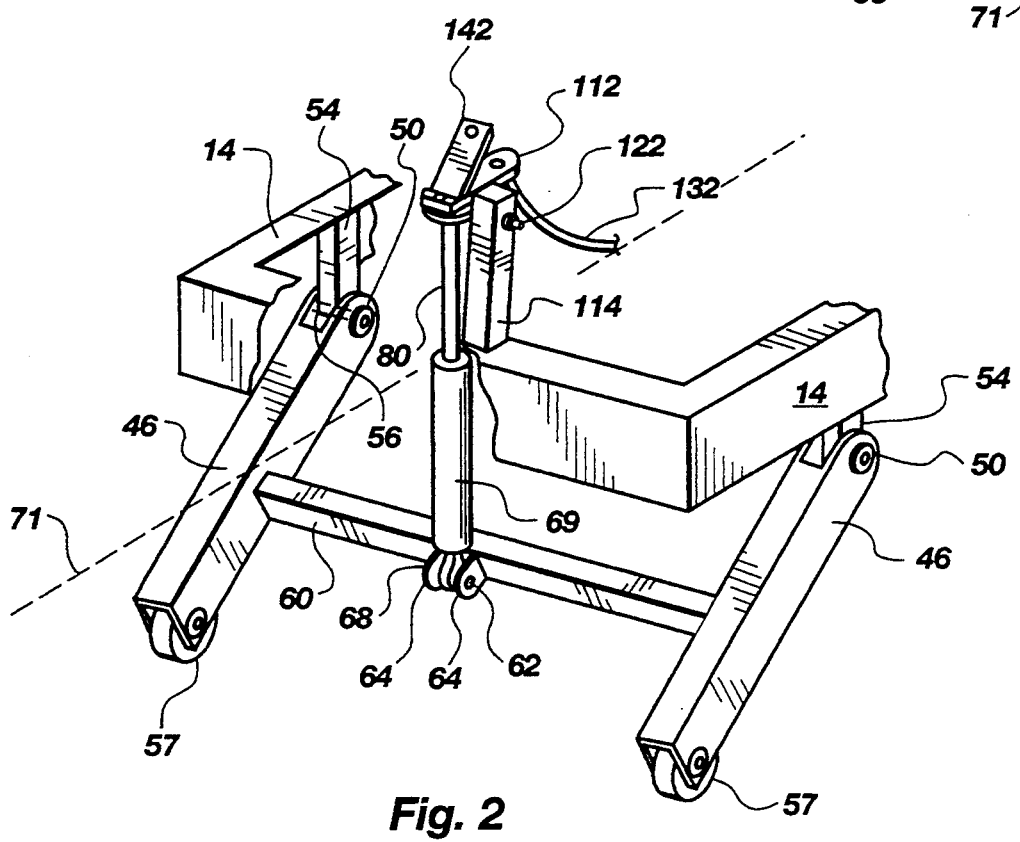
FIG. 2 is an elevated sectional perspective view of a pneumatic spring actuated support.
Figure 5:
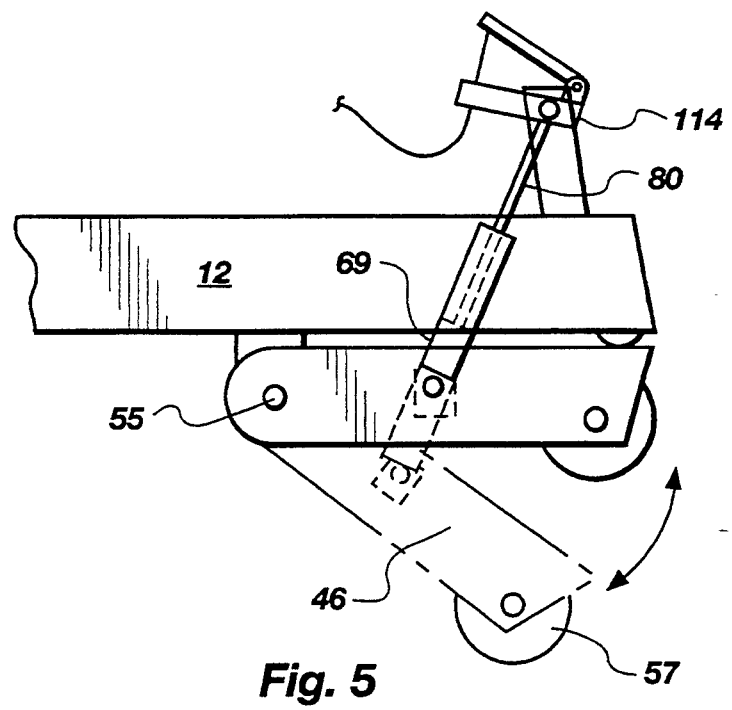
FIG. 5 is a sectional side view of a support leg of the invention shown in a retracted and extended position.

FIGS. 2 and 3 illustrate in an elevated sectional perspective view some of the principal components of the adjustable incline system. A pair of elongate, shaft-like support legs 46 are each pivotally mounted to a respective frame rail member 14 by means of a nut and bolt arrangement 50. As shown, each support leg 46 includes on a first end thereof a bifurcated fork-like clevis 51. Each fork 52 of the clevis 51 defines an aperture 53 therein in register with an aperture defined within an opposing fork of the clevis 51. A shaft-like extension 54, mounted on each frame rail 14, defines a channel 53A therethrough. The channel 53A in the extension 54 is aligned with the apertures 53 in the bifurcated forks 52 of the clevis 51 and a bolt 55, having male threads on its end, is extended through the apertures 53 and channel 53A to form a pivot mounting for each support leg 46. A female threaded nut 56 is threadedly mounted on the bolt 55 to retain the bolt 55 in place.

A wheel 57 is rotatably mounted in the opposing end of each support leg by means of an elongate axle 58 formed by a nut and bolt arrangement 59 which passes through apertures defined in the support 46 similar to the above-described mounting of the support on extension 54. The support leg 46 as illustrated has a generally "U"-shaped cross-section when viewed from its end. Each wheel 57 is positioned to rollingly contact and abut against an underlying surface, e.g. the ground or floor on which the treadmill 10 is placed.

A connection or cross bar 60 is mounted to each support leg 46 at a location intermediate the opposing ends of each support leg 46. In a preferred embodiment, the cross bar is mounted midway between the opposing ends each support leg 46.

Support legs 46 and cross bar 60 may be fabricated from steel or some other rigid structural material.

Positioned along the length of cross bar 60 and preferably midway between the opposing ends of the cross bar 60 is a mounting bracket 62. As illustrated, bracket 62 is mounted to cross bar 60 to extend outwardly therefrom. The bracket 62 includes two extensions which each define an aperture therein, one aperture being in register with the other. A bolt 64 extends through the apertures. The bolt 64 also passes through an eye 66 defined in the end extension 68 of a gas spring 69. The head of the bolt 64, in cooperation with a female threaded nut 70 threaded onto the male threads on the end of the bolt 64 retain the gas spring 69 in a pivoting association with bracket 62. The gas spring 69 is mounted centrally, preferably midway between the two support legs 46, and generally midway between the opposing rails 14 of the treadmill frame 12. As shown in FIG. 2, the gas spring 69 may be positioned vertically and upright such that it intersects the longitudinal axis 71 of the treadmill 10.

In a previous patent disclosure (see U.S. Pat. No. 4,591,147 (Smith et el.) wherein gas springs had been utilized in a treadmill support system, a gas spring had been associated with and positioned proximate to each of two outwardly extending support legs, i.e., the gas springs are not positioned centrally of the treadmill frame put were positioned laterally of the treadmills longitudinal axis. In the instant embodiment the gas spring 69 is positioned on the longitudinal axis 71 of the treadmill, i.e. centrally within the treadmill frame.

Adjustable gas springs 69 which may be utilized in the invention are those manufactured by the Gas Spring Company of Colmar, Pa. and Suspa of Altdorf, West Germany. More specific description of gas springs which may be used in this application are disclosed in U.S. Pat. Nos. 3,966,182; 3,963,101, 4,093,196 and U.K. Patent 1,505,702, the disclosures of which are hereby incorporated by reference.

A preferred gas spring 69 utilized in the invention is of a type wherein the positioning of a piston 72 within a hollow cylinder 74 is made adjustable by a valving system 76. As shown in FIG. 7, a hollow closed ended cylinder 74 contains a cylindrically shaped piston 72, the piston 72 being reciprocably mounted within the cylinder 74 for movement in the directions indicated by arrows 78A and 78B. The piston 72 is mounted with a piston rod 80, which extends outwardly and sealedly through one of the closed endwalls of the cylinder 74, and is likewise made reciprocably slidable through that endwall 82. The endwall 82 of the cylinder 74 includes a seal which abuts against the rod 80 to form an air-tight seal thereagainst. On the opposing endwall 83 of cylinder 74 the extension 68 which defines an eyelet 66 therein is fixedly mounted.

The piston rod is shown as defining a hollow elongate channel 86 which extends along the length of the rod 80. Piston 72 defines an elongate channel 88 which communicates one end of the piston with its opposing end. An elongate cylindrical rod 90 is inserted into channel 86 and is reciprocably slidable within that channel. Rod 90 mechanically engages a valve 92 mounted within the piston 72 whereby displacement of the rod 90 in the direction indicated by arrow 94 operates to open the valve 92 as shown in FIG. 8. A displacement of the rod 90 in the direction indicated by arrow 96 sufficient to remove the rod 90 from an urging engagement against the valve 92 causes the valve 92 to return to a closed orientation shown in FIG. 7. An orifice 106 defined within the piston 72 communicates with a first sealed pressure chamber 102. As illustrated, chamber 102 contains a pressurized gas 102A and a liquid, e.g. oil 102B. A second sealed pressure chamber 104 positioned on the opposite side of the piston 72 is filled with a liquid, e.g. oil 104A. Each of these pressure chambers are formed by an association of a respective endwall of the cylinder 74, a portion of the sidewall 107 of cylinder 74 and an endwall 108 of piston 72. As shown in FIGS. 7 and 8, a plurality of seals 109 form an endwall of the chamber 102. The seals 109 form a fluid-tight seal against rod 80 and the sidewalls 107.

In the closed orientation illustrated in FIG. 7, the cylinder acts as a dampening means in that forces directed along the rod 80 in the direction indicated by arrow 78A are resisted by the fluid in chamber 104. Forces directed in the direction indicated by arrow 78B are resisted by the fluids in chamber 102. As the valve 92 is actuated by a displacement of the rod 90, the valve 92 is displaced partially through the piston channel 88 such that the valve seat 101A clears the open port of channel 88. As shown in FIG. 7, seals 105A and 105B mounted within piston 72 abut against the valve 92 to seal that portion of channel 88 positioned between the two seals. Therefore, the oil in chamber 102 is precluded from flowing into chamber 104, through piston orifice 106 and around the valve 92. As the valve 92 is displaced as shown in FIG. 8, the seals 105B no longer form a seal against the valve 92 due to its medianly positioned neck 92A. As a result, the oil in chamber 102 is displaced through the orifice 106 due to the pressure exerted thereon by the high pressure gaseous fluid in chamber 102. The oil flows into channel 88 around the valve 92 and then through the open port of channel 88 and thereafter into chamber 104. Due to the incompressibility of the oil and the narrow passageway, the flow of oil is relatively slow, permitting a substantially controlled displacement of the piston 72. As the oil flows, the piston 72 is displaced in the direction indicated by arrow 78B, causing the rod 80 to be extended outward from the cylinder and thereby elevating or increasing the incline of the treadmill. To lower the treadmill, the user stands on the treadmill substantially over and atop the gas cylinder support and opens the valve 92. The weight of the user overcomes the pressure exerted on the oil 102B by the gas 102A in that the pressure applied to the oil in chamber 104 by piston 72 causes that oil to flow into chamber 102 through a reversal of the route previously described, i.e. through the open port of channel 88, around valve 92 and through orifice 106 and thereafter into chamber 102.

In operation, a force loading of the piston rod 80 in the direction indicated by arrow 94 causes a force loading on the piston 72 within the cylinder When the user wishes to adjust the elevation of the treadmill, i.e. the incline imparted to the treadmill by the gas spring 69, the rod 90 is depressed (i.e. displaced in the direction indicated by arrow 96). The rod 90 thereby actuates valve 92 and opens channel 88. If the user desires to lower the inclined end 95 of the treadmill, he then applies a force to that end 95, for example by standing on that end and thereby applying his body weight to the piston rod 80 and piston 72. Since the two pressure chambers 102 and 104 are now pneumatically (i.e. hydraulically in the case of liquids being in the cylinder) connected, air or liquid within pressure chamber 104 flows through channel 88 into chamber 102, until an equilibrium of forces is achieved. After the forces, i.e. the pressure induced force in chamber 102 on the piston 72, supplemented by the force applied to piston 72 by the user's weight opposing the pressure induced force in chamber 104 on piston 72 are balanced, the rod 90 is displaced in the direction indicated by arrow 96, until the valve 92 is no longer engaged, e.g. urged outward by the rod 90 and thereby returns to its closed orientation. Thereafter, while the user is on the treadmill, the elevation of the inclined end is retained at substantially the new height. Understandably, the height of the elevated treadmill end may vary somewhat as the location of the user on the treadmill is varied e.g. as the user approaches the opposing end of the treadmill the magnitude of force being applied to the piston rod 90 is decreased, thereby causing a slight increase in elevation, since the force applied to the piston 72 by the fluid in chamber 104 is now greater than the total opposing force made up of that resulting from the gas in chamber 102 in conjunction with the force being applied externally to the piston 72 by rod 80.

The ability to change the treadmill's elevation while the user is standing on the treadmill is novel in that prior devices have conventionally required the user to step off the treadmill in order to modify the treadmill's orientation.

As shown in FIG. 1, the treadmill contacts the underlying surface, e.g. the ground, through intermediation of an elongate support 91. In actuating the incline system, the user can adjust the amount of force being applied to the gas cylinder by varying his location vis-a-vis the support 91. Noticeably, when a force is directed against the action of the gas spring, the degree of incline afforded by the spring's action will be reduced accordingly. By locating himself on the treadmill between the support 91 and the end 93 of the treadmill, the user's weight actually urges the opposing end 95 of the treadmill upwards, thereby assisting the gas cylinder in increasing the Inclination. The support 91 acts much like a fulcrum in a conventional leverage sense. As the user varies his location by advancing beyond the support 91 and thereby approaching the end 95, the amount of the user's weight which is directed in opposition to the gas spring's length expansion is increased. Therefore, the inclination achieved by actuating the gas spring is reduced as the location of the user advances toward end 95 during the period of the gas spring's actuation.

After the desired positioning of the piston within the cylinder is achieved, the valve 92 is closed; whereupon, the pneumatic and/or hydraulic pressures being substantially balanced, those pressures operate to retain the treadmill in the selected orientation.

FIG. 8 illustrates the gas spring 69 in an actuated condition. As shown, the valve 92 has been inserted partially through the piston head channel 88 sufficiently that the valve seat 101A on the end of that valve is positioned clear of the open port 102A of the channel 88. Liquid 102A can then be directed through orifice 106.

As shown in FIG. 2, in a preferred embodiment, the gas cylinder of the type shown in FIG. 7 is positioned such that its extension 68 is pivotely mounted on bracket 62. The cylinder extends upwardly, oftentimes at an angle inclined to the horizon. The rod 80 extends outwardly from the cylinder 74 to be received within a mounting platform 112 which in turn is pivotely mounted to a rigid support 114 mounted on a cross bar 116 of the frame 12 of the treadmill 10.

As shown to advantage in FIGS. 2 and 4, platform 112 includes a first elongate base 120 which may be pivotely or fixedly secured to support 114 by a nut and bolt fitting 122. The base 120 defines a female threaded aperture 125 which threadedly receieves the male threaded extension 126 mounted on gas spring 69. A threaded nut 128 may be threaded onto the extension 126 and may be threaded into abutment against the platform to secure the extension 126 within the aperture 125. The platform base 120 also defines a second aperture 130 therein which slidingly receives a cable 132 having a resilient metal core 134. Core 134 is slidingly and reciprocably mounted within a plastic cover 136. Fitted on the end of cable 132 is a male threaded extension 138 which is secured to the cover 136. The core 134 passes slidingly and reciprocably through the extension 138. Cable 132 extends through aperture 130, extension 138 being positioned within the aperture 130. A female threaded nut 140 threadingly cooperates with the extension 138 to retain the extension 138 in position within the aperture 130 on the base 120 as shown to advantage in FIG. 4.

The core 134 extends outwardly from aperture 130 and is fixedly secured to one end of an elongate lever 142. As shown, lever 142 is pivotally mounted at its other end to base 120 by a pivot pin 144 which passes through regietered openings in the base 120 and the lever 142. Lever 142 is pivotable in the directions shown by arrows 146 and 148. As the cable core 134 is retracted into cable cover 136 in the direction shown by arrow 150, the lever 142 is brought into abutment against rod 90, thereby actuating, i.e. opening valve 92 as previously described above. An extension of the core 134 outward from the cover 136 as shown by arrow 152 causes the lever to be urged outward away from the rod 90, thereby causing the valve to be urged into a closed orientation.

Figure 6:
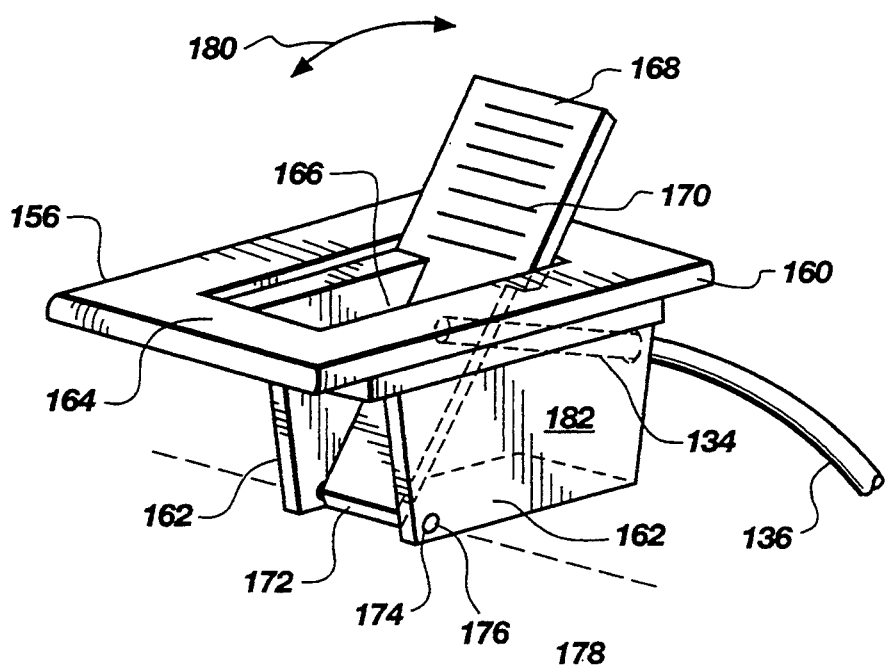
FIG. 6 is a perspective view of a control lever of the invention.

Cable 132 extends from platform 120 upward along supports 42 and is mounted to console 34 by means of a control lever 156 as illustrated in FIGS. 1 and 6. Lever 156 includes a frame 160 defining a pair of spaced vertical extensions 162 and a perpendicularly oriented base platform 164 mounted on those extensions 162. The platform 164 and extensions 162 define a channel 166 in which is mounted a lever 168. As shown, lever 168 is an elongate member having a graspable end 170. The opposing end 172 is pivotedly mounted between and to the extensions 162 by means of pivot pins 174 which extend outwardly from opposing sides of the lever 168 and are slidably received in openings 176 defined within the extensions 162.

The core 134 of cable 132 is secured to the lever 168 as shown. The cover 136 of cable 132 is secured to an endwall 182 which is mounted between the extensions 162, such that the core 134 may be freely slided in and out of the cover 136 while that cover is retained in place. The cover 136 may be mounted to the endwall utilizing a mounting arrangement similar to that shown in FIG. 4 and utilized to secure the cover 136 to the base 120. The lever being reciprocably rotatable about its pivot axis 178 in the directions indicated by arrow 180, permits the user to grasp its end 170 and thereby pivot the lever to either retract or extend the core 134 from cover 136. The effects of the displacement of the core 134 vis-a-vis the gas spring 69 have previously been explained.

The instant embodiment provides a means for the user to adjust the inclined height of one end of the treadmill by manipulating the lever and adjusting the forces being applied to the treadmill by the gas spring. Thereafter, the lever is reset so as to close the valve 92 and lock the gas spring into the desired orientation.

It is to be understood that the embodiments of the invention described are merely illustrative of the application of the principles of the invention. Reference herein to details of the illustrated embodiment is not intended to limit the scope of the claims which themselves recite those features regarded as essential to the invention.

What is claimed

1. A method of adjusting the incline of a treadmill, said method comprising:
   providing a treadmill, supported above an underlying surface by an action of a length adjustable spring, said length adjustable spring being positioned to apply a positive, upwardly-directed force to said treadmill upon an opening of a valve of said length adjustable spring;
   positioning a user atop said treadmill;
   said user opening said valve of said length adjustable spring;
   said user walking along an upper surface of said treadmill while said valve is in an open position to adjust said incline of said treadmill to a new incline; and
   said user closing said valve to lock said treadmill in said new incline.

2. The method of claim 1 wherein said user walks along a length of said treadmill.

3. The method of claim 1 wherein said user opens said valve while positioned in an upright position atop said treadmill.

4. The method of claim 1 wherein said treadmill rotates about a fulcrum as said incline is modified to said new incline.

5. The method of claim 4 wherein said walking of said user is directed along a length of said treadmill to alter a moment being applied by the weight of said user about said fulcrum.

6. The method of claim 1 wherein said user closes said valve while positioned in an upright position atop said treadmill.

7. A method of adjusting the incline of a treadmill, said method comprising:
 providing a treadmill having a support mechanically associated with said treadmill, said support being displaceable by an action of a length adjustable spring upon an opening of a valve of said length adjustable spring, a displacement of said support effecting a change in an incline of said treadmill;
 positioning a user atop said treadmill;
 said user opening said valve of said length adjustable spring;
 said user walking along an upper surface of said treadmill while said valve is in an open position to adjust said incline of said treadmill to a new incline; and
 said user closing said valve to lock said treadmill in said new incline.

8. The method of claim 7 wherein said user opens said valve while positioned in an upright position atop said treadmill.

9. The method of claim 7 wherein said treadmill rotates about a fulcrum as said incline is modified to said new incline.

10. The method of claim 9 wherein said walking of said user is directed along a length of said treadmill thereby altering a moment being applied by the weight of said user about said fulcrum.

11. The method of claim 7 wherein said user closes said valve while positioned in an upright position atop said treadmill.

12. The method of claim 7 wherein said length adjustable spring is connected on a first end to said treadmill and is connected on a second end to said support.

13. The method of claim 7 wherein said support rotates about said treadmill when said support is displaced.

14. The method of claim 7 wherein said support is connected to said treadmill proximate an end of said treadmill.

15. The method of claim 7 wherein said support travels along an underlying support surface when it is displaced.

16. The method of claim 7 wherein said length adjustable spring is positioned to apply a force to said treadmill for lifting said treadmill upwardly upon an opening of said valve.

17. A method of adjusting the incline of a treadmill, said method comprising:
 providing a treadmill having a support mechanically associated with said treadmill, said support being displaceable by an action of a length adjustable spring upon an opening of a valve of said length adjustable spring, a displacement of said support effecting a change in an incline of said treadmill;
 positioning a user atop said treadmill;
 said user opening said valve of said length adjustable spring while positioned atop said treadmill in an upright position;
 said user walking along an upper surface of said treadmill while said valve is in an open position causing said treadmill to rotate about a fulcrum and modify said incline of said treadmill to a new incline; and
 said user closing said valve to lock said treadmill in said new incline.

18. The method of claim 17 wherein said user closes said valve while positioned in an upright position atop said treadmill.

19. The method of claim 17 wherein said walking of said user is directed along a length of said treadmill to alter a moment being applied by the weight of said user about said fulcrum.

20. An adjustable incline system in combination with a treadmill, said adjustable incline system being adapted to lift and support said treadmill above an underlying floor in different angular orientations relative to said underlying floor, said combination comprising:
 a treadmill having a first end, a second end, a bottom surface, and a top surface;
 a support means mechanically associated with said treadmill proximate said first end for engaging said underlying floor and for lifting and supporting said first end of said treadmill above said underlying floor;
 a spring means mechanically associated with said support means and said treadmill for apply in it a force against said support means for urging said support means outwardly away from said treadmill; and
 control means mechanically associated with said spring means for controlling said force exerted by said spring means, said control means being operable by an upright user positioned on said top surface to vary the inclination of said treadmill upon a movement of said upright user along said top surface.

21. An adjustable incline system in combination with a treadmill, said adjustable incline system being adapted to lift and support one end of said treadmill above an underlying floor in different angular orientations relative to said underlying floor, said combination comprising:
 a pair of spaced apart support legs, each of said pair of spaced apart support legs having a first end mechanically associated with an treadmill and a second end for engaging an underlying floor to lift and support said treadmill above said underlying floor, said second end being movable on said underlying floor for varying the inclination of said treadmill relative to said underlying floor;
 a connection bar mounted to said pair of spaced apart support legs to extend therebetween:
 a length adjustable spring means mechanically associated with said connection bar on its first end and mechanically associated with said treadmill on its second end for applying a force against said support means, for urging said support means outwardly away from said treadmill, and along said underlying floor, said adjustable pneumatic spring means including an actuation pin adapted for controlling said force exerted by said length adjustable spring means;

a fulcrum support mounted proximate said second end of said treadmill for supporting said treadmill above an underlying floor;

control means, mechanically associated with said adjustable pneumatic spring means, for operating said actuation pin, said control means including a control member, linkage means and an actuating lever member, said actuating lever member being actuated by said control member and said linkage means to mechanically engage said actuation pin, said actuating lever member being displaceable to effect a corresponding displacement of said actuation pin, said control means being operable by an upright user positioned on said top surface to displace said actuation pin and vary the inclination of said treadmill upon movement of said upright user relative to said fulcrum support along said top surface.

22. An adjustable incline system in combination with a treadmill which has a first end and a second end and which is operable in different angular orientations, said combination comprising:

a support means mechanically associated with said treadmill proximate the first end thereof for supporting said first end above a floor-like support surface;

a length adjustable spring means mechanically associating said support means and said treadmill for applying a force to urge said support means away from said treadmill, said length adjustable spring means including an actuation pin adapted for controlling said force exerted by said length adjustable spring means; and control means mechanically associated with said length adjustable spring means for operating said actuation pin, said control means including a control member, linkage means and an actuating lever member, said actuating lever member being actuated via said control member and said linkage means to mechanically engage said actuation pin, said actuating lever member being displaceable to effect a corresponding displacement of said actuating pin and said control member being positioned on said treadmill for hand operation by an upright user positioned on said treadmill; and a fulcrum attached to said treadmill to engage said floor-like support surface and spaced from said second end toward said first end a distance selected for said upright user positioned on said treadmill to vary the effective force of the user's weight at said first end by varying the upright user's position on said treadmill relative to said fulcrum.

23. An adjustable incline system in combination with a treadmill, said adjustable incline system being adapted to lift and support said treadmill above an underlying floor selectively in different angular orientations relative to said underlying floor responsive to a user standing upright on said treadmill, said combination comprising:

a support means mechanically associated with an treadmill for engaging an underlying floor and for lifting and supporting said treadmill above said underlying floor, said support means being movable along said underlying floor for varying an inclination of said treadmill relative to said underlying floor;

a length adjustable spring means mechanically associated with said support means and said treadmill for applying a force against said support means, for urging said support means outwardly away from said treadmill and along said underlying floor, said adjustable pneumatic spring means including an actuation pin adapted for controlling said force exerted by said length adjustable spring means; and control means mechanically associated with said length adjustable spring means for operating said actuation pin, said control means including a control member, linkage means and an actuating lever member, said actuating lever member being actuated by said control member and said linkage means to mechanically engage said actuation pin, said actuating lever member being displaceable to effect a corresponding displacement of said actuation pin, said control member be accessible by a user standing upright on said treadmill;

wherein said inclination of said treadmill is altered as said actuation pin is displaced and said user moves on said treadmill either toward or away from said support means, said treadmill being releasably secured in a selected inclination by said user on said treadmill upon said user returning said actuation pin to its undisplaced condition by operating of said control member.

* * * * *